(12) United States Patent
Morita et al.

(10) Patent No.: US 10,261,352 B2
(45) Date of Patent: Apr. 16, 2019

(54) LIGHT DIMMER MODULE, LIGHT DIMMER SYSTEM, AND IMAGING DEVICE

(71) Applicant: SONY CORPORATION, Tokyo (JP)

(72) Inventors: Shintarou Morita, Kanagawa (JP); Noboru Katsui, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/129,040

(22) PCT Filed: Feb. 6, 2015

(86) PCT No.: PCT/JP2015/053350
§ 371 (c)(1),
(2) Date: Sep. 26, 2016

(87) PCT Pub. No.: WO2015/151579
PCT Pub. Date: Oct. 8, 2015

(65) Prior Publication Data
US 2017/0108725 A1 Apr. 20, 2017

(30) Foreign Application Priority Data
Apr. 4, 2014 (JP) ................................ 2014-077799

(51) Int. Cl.
*G02F 1/1333* (2006.01)
*G02F 1/133* (2006.01)
*G03B 17/00* (2006.01)
*G03B 9/02* (2006.01)
*G03B 11/00* (2006.01)
*G02F 1/1335* (2006.01)
*G02F 1/13* (2006.01)

(52) U.S. Cl.
CPC .... *G02F 1/13318* (2013.01); *G02F 1/133512* (2013.01); *G03B 9/02* (2013.01); *G03B 11/00* (2013.01); *G03B 17/00* (2013.01); *G02F 1/1309* (2013.01); *G02F 2201/58* (2013.01)

(58) Field of Classification Search
CPC ........... G02F 1/13318; G02F 1/133512; G02F 1/1333; G02F 1/1337
USPC .................... 315/207, 227, 204, 174, 690, 8
See application file for complete search history.

(56) References Cited

U.S. PATENT DOCUMENTS

| 8,009,158 B2* | 8/2011 | Chen .................... G09G 3/3406 345/102 |
| 2007/0252829 A1* | 11/2007 | Kobashi ............... G09G 3/3406 345/204 |
| 2008/0186558 A1* | 8/2008 | Lee .......................... G02B 6/04 359/227 |
| 2010/0085338 A1* | 4/2010 | Miguchi ........... G02F 1/133609 345/207 |
| 2010/0128010 A1* | 5/2010 | Katoh .................. G09G 3/3406 345/207 |

(Continued)

FOREIGN PATENT DOCUMENTS

| JP | 2002-082358 A | 3/2002 |
| JP | 2003-060947 A | 2/2003 |

(Continued)

*Primary Examiner* — Douglas W Owens
*Assistant Examiner* — Syed M Kaiser
(74) *Attorney, Agent, or Firm* — Chip Law Group

(57) ABSTRACT

There is provided a light dimmer module including a liquid crystal layer disposed between a pair of electrodes, and a transmittance sensor that detects light transmittance of the liquid crystal layer.

12 Claims, 9 Drawing Sheets

(56) References Cited

U.S. PATENT DOCUMENTS

| | | | |
|---|---|---|---|
| 2010/0253660 A1* | 10/2010 | Hashimoto | G01J 1/02 345/207 |
| 2011/0043486 A1* | 2/2011 | Hagiwara | G02F 1/133514 345/175 |
| 2011/0310059 A1* | 12/2011 | Miyamoto | G06F 3/0412 345/174 |
| 2013/0127776 A1* | 5/2013 | Guard | G06F 3/0412 345/174 |
| 2014/0139559 A1* | 5/2014 | Yoo | G06F 3/147 345/690 |
| 2014/0340286 A1* | 11/2014 | Machida | G02B 26/0833 345/8 |
| 2015/0085200 A1* | 3/2015 | Choi | G02F 1/1309 349/1 |
| 2016/0018925 A1* | 1/2016 | Yashiro | G06F 3/044 345/174 |
| 2016/0103359 A1* | 4/2016 | Kimura | G02B 5/201 349/33 |

FOREIGN PATENT DOCUMENTS

| | | |
|---|---|---|
| JP | 2007-300264 A | 11/2007 |
| JP | 2007-315862 A | 12/2007 |
| JP | 2008-003301 A | 1/2008 |
| JP | 2010-243647 A | 10/2010 |

* cited by examiner

[ FIG. 1 ]
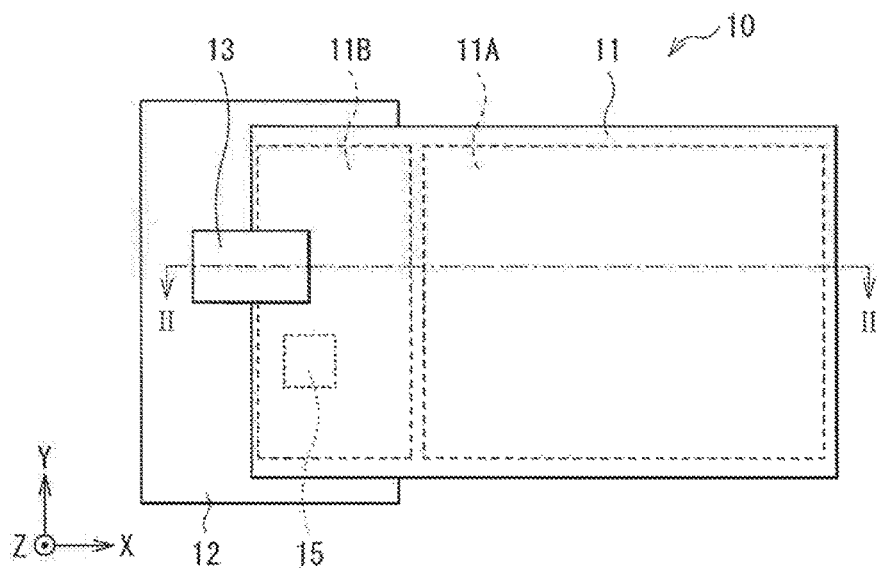
[ FIG. 2 ]
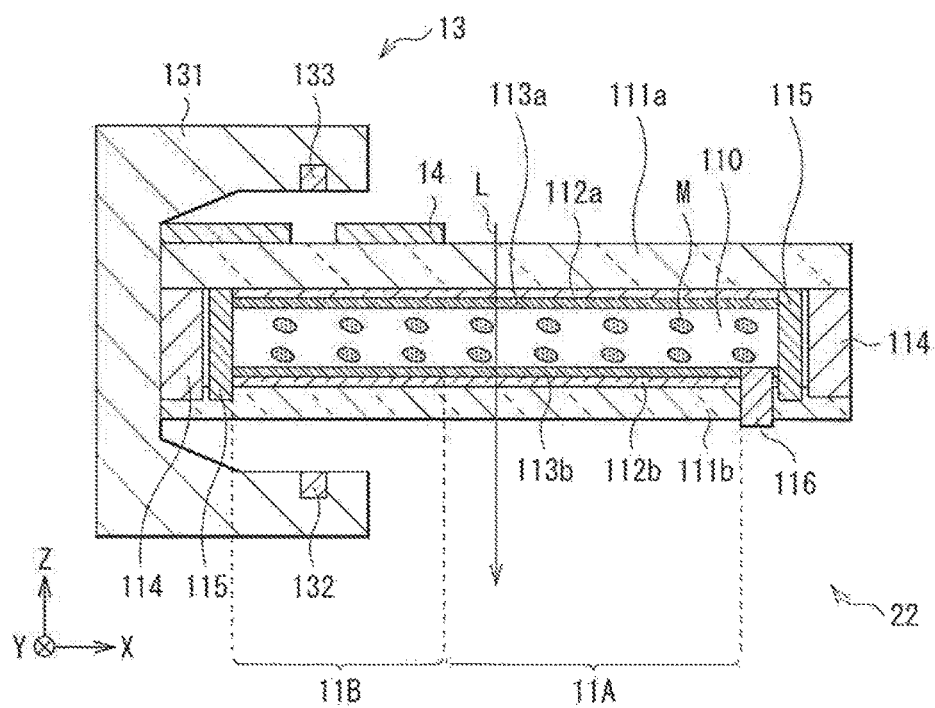

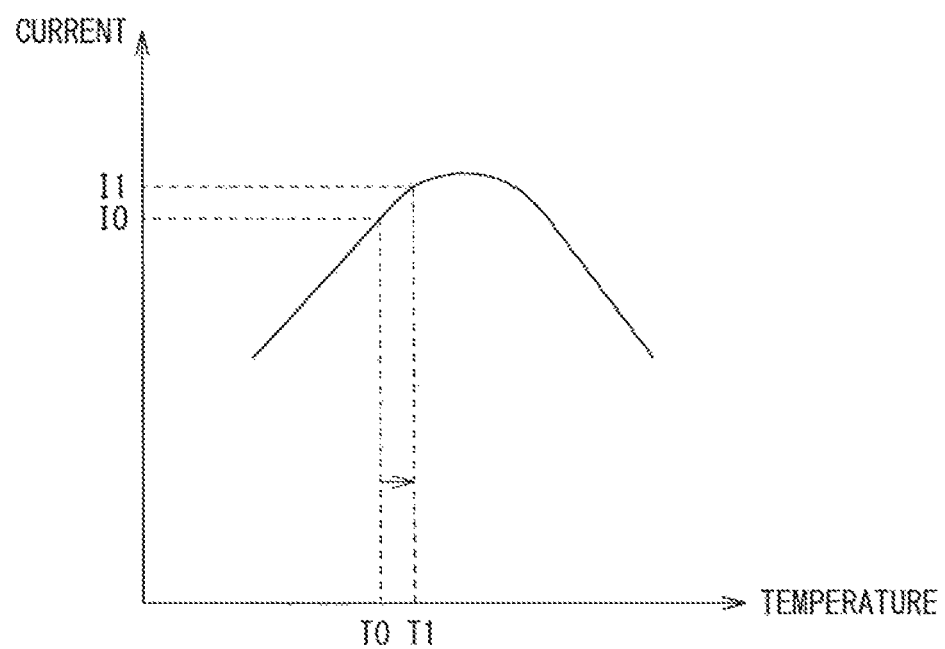

[FIG. 4]
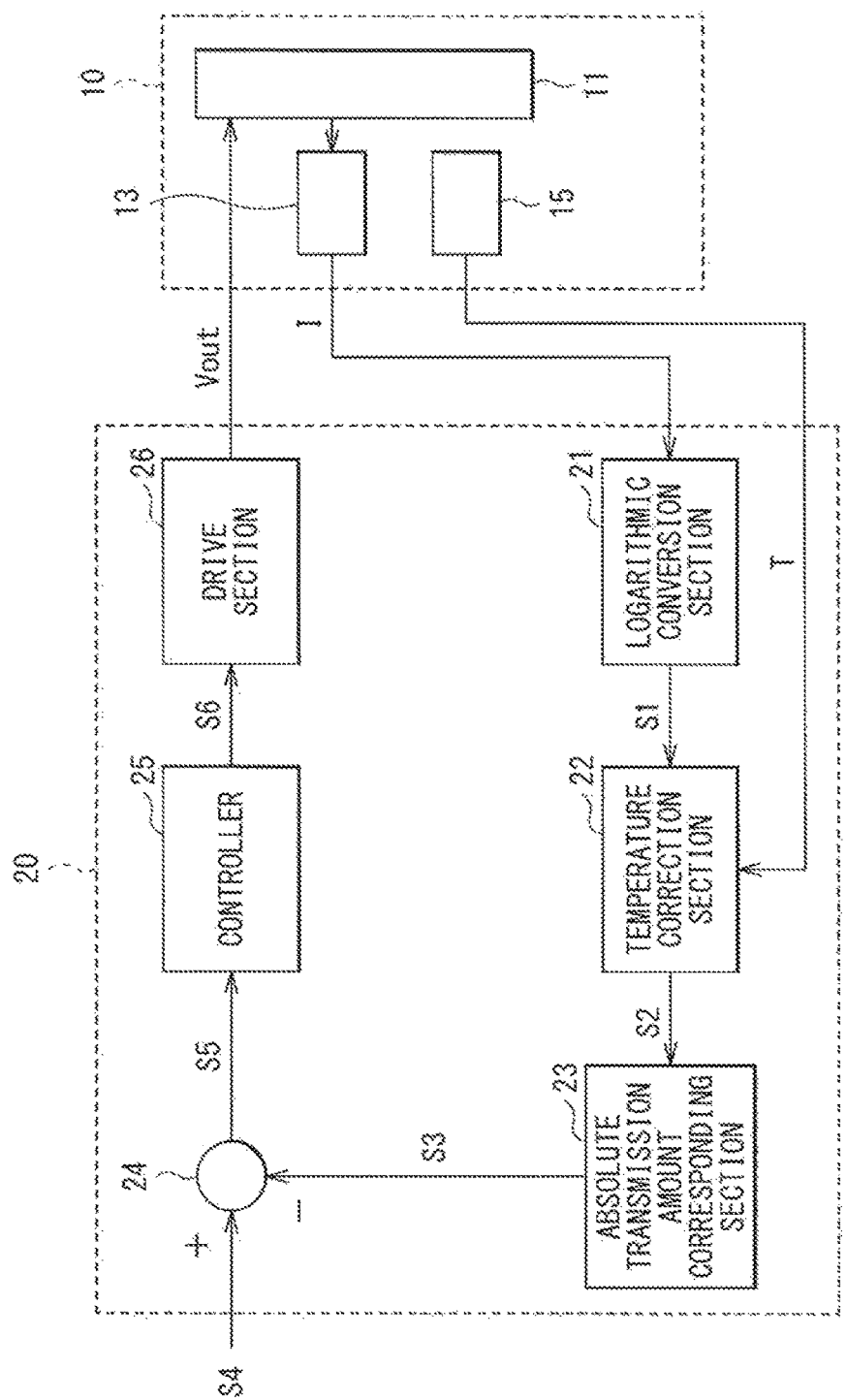

[ FIG. 5 ]
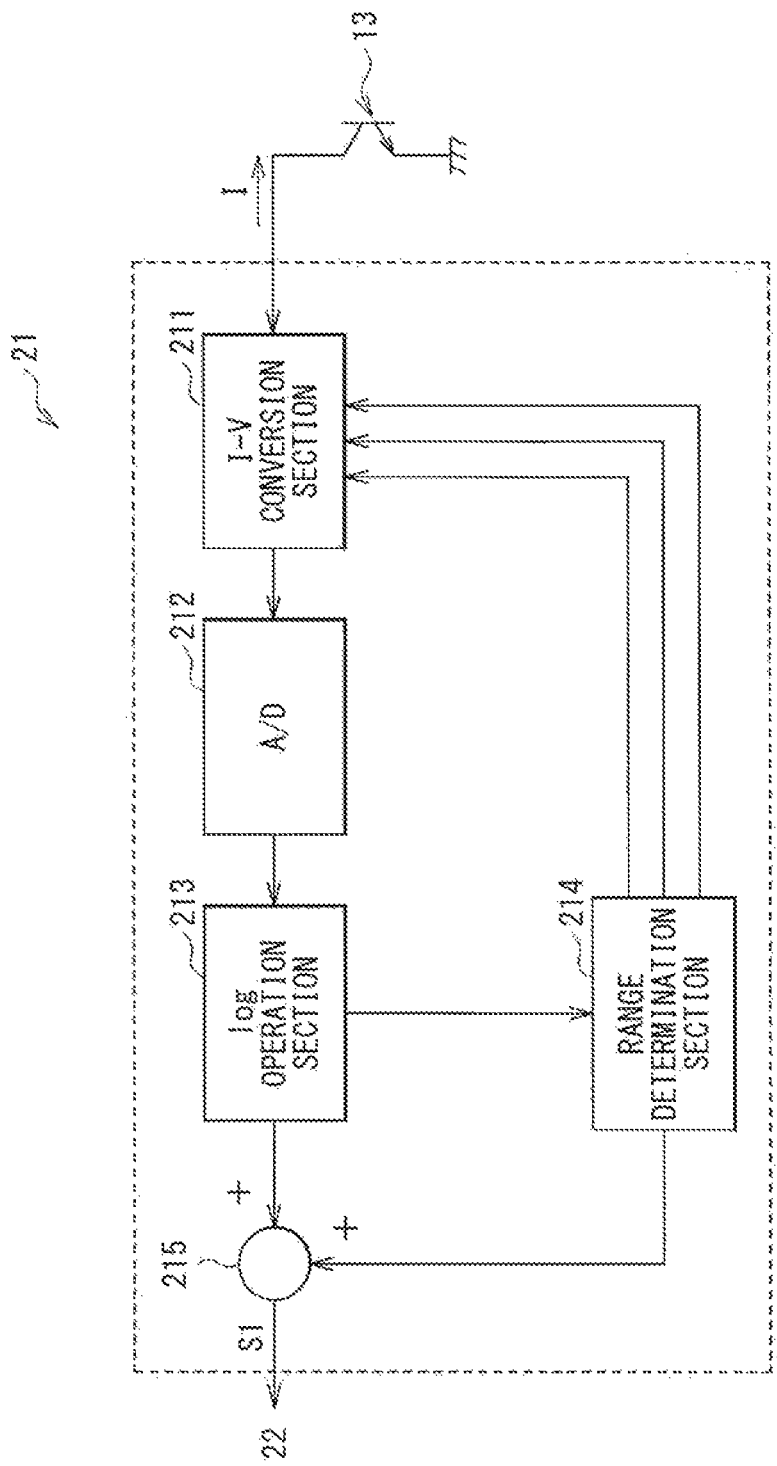

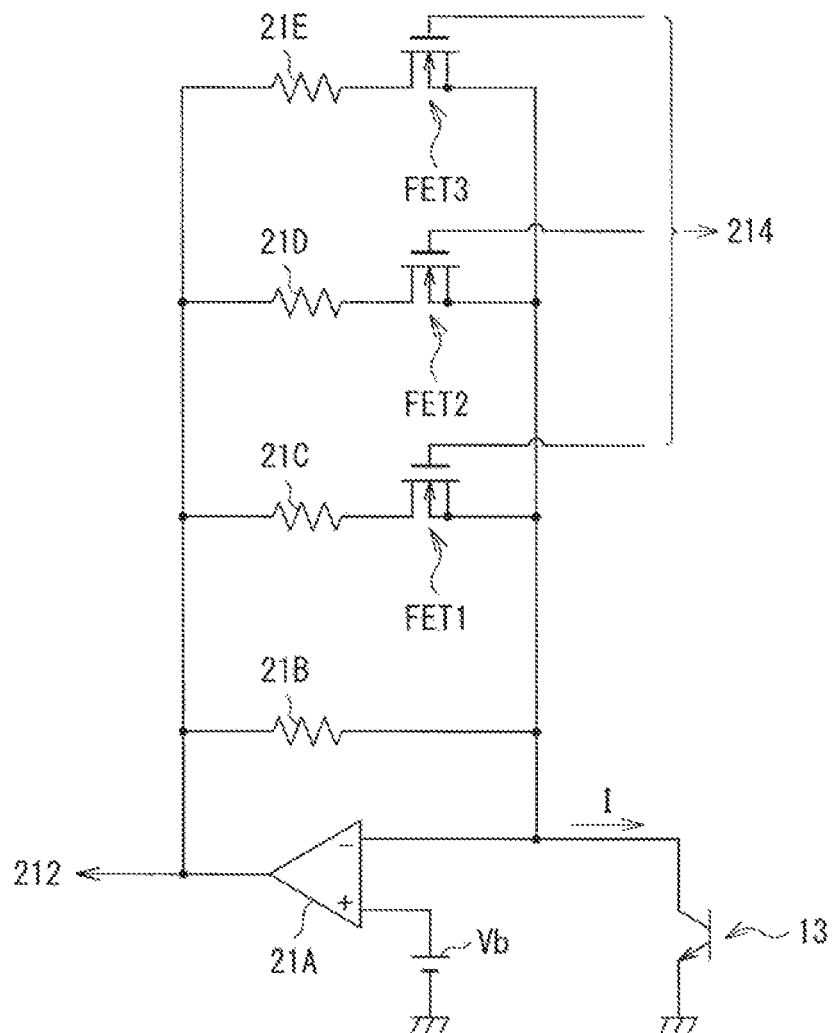
[ FIG. 6 ]

[FIG. 7]
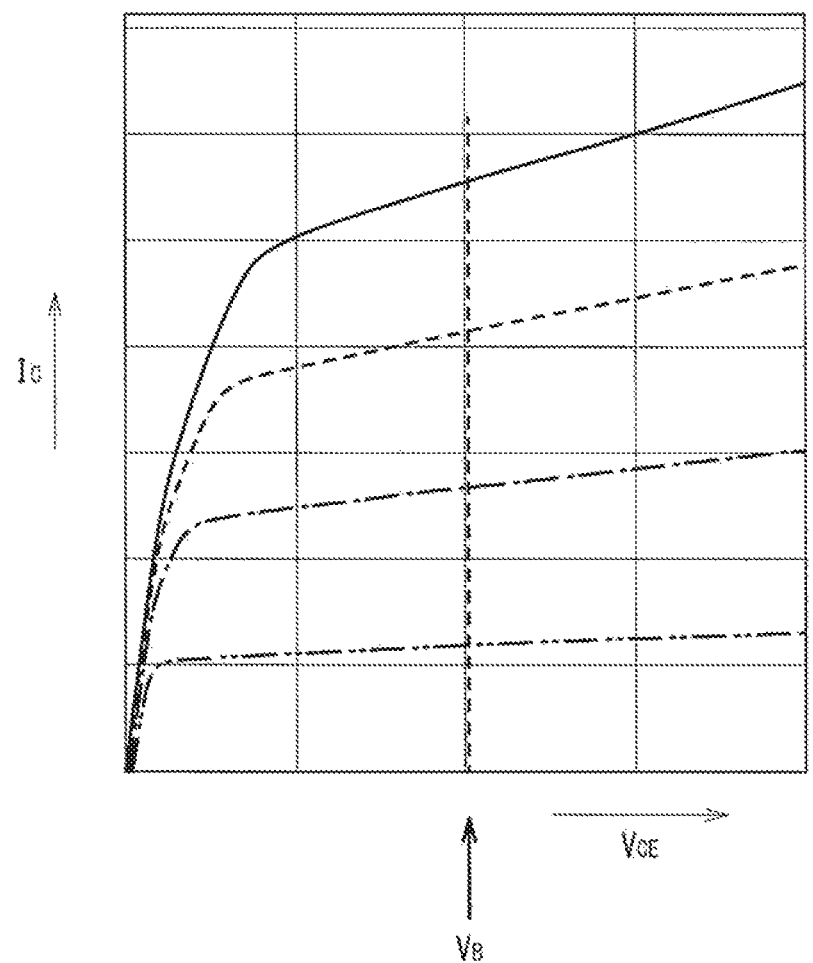

[ FIG. 8 ]
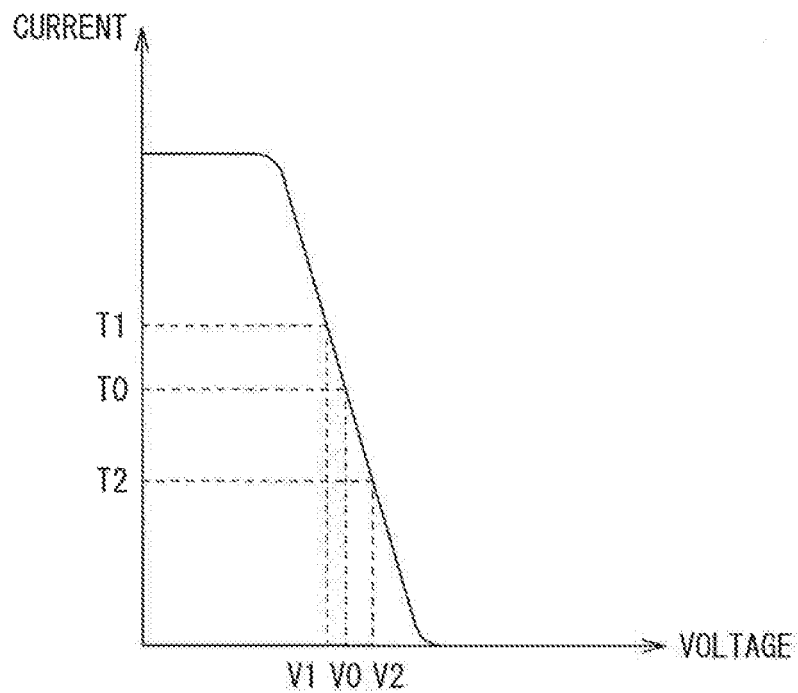
[ FIG. 9 ]
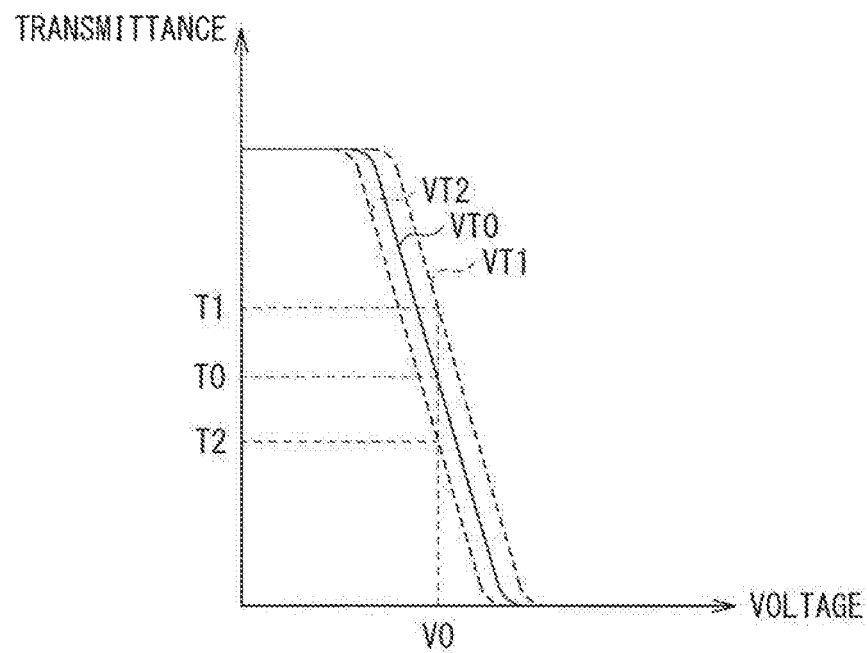

[ FIG. 10 ]
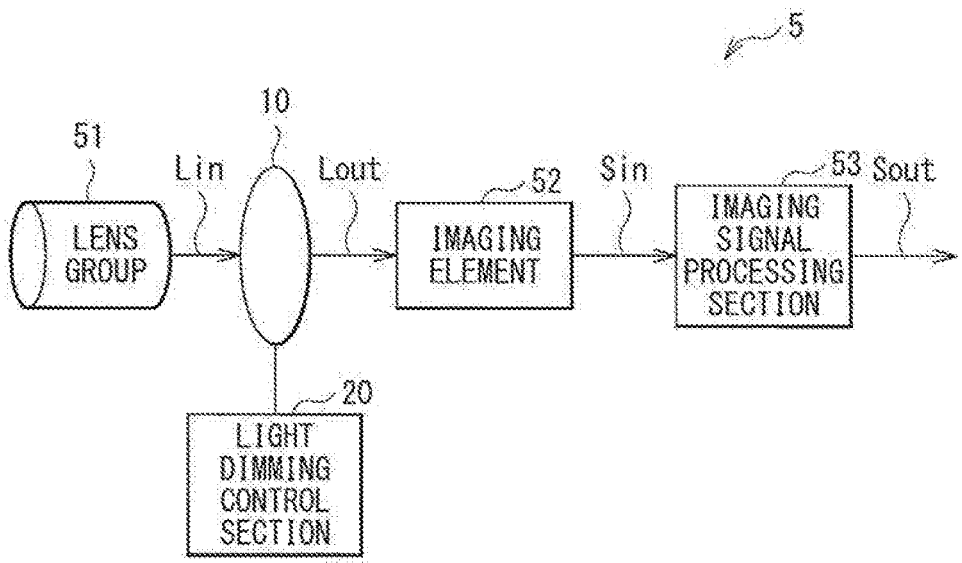
[ FIG. 11 ]
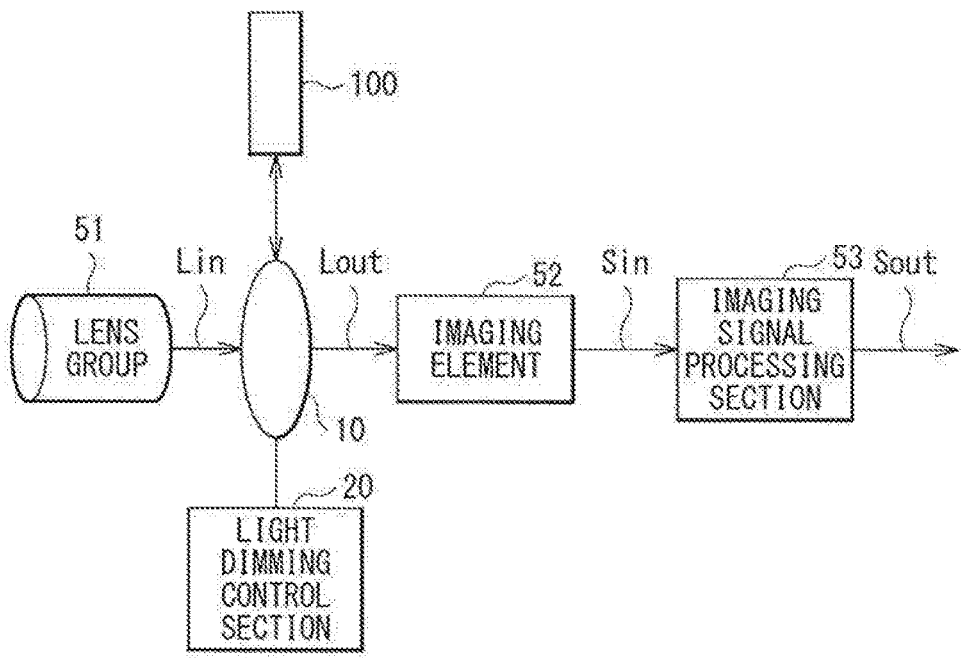

[ FIG. 12 ]
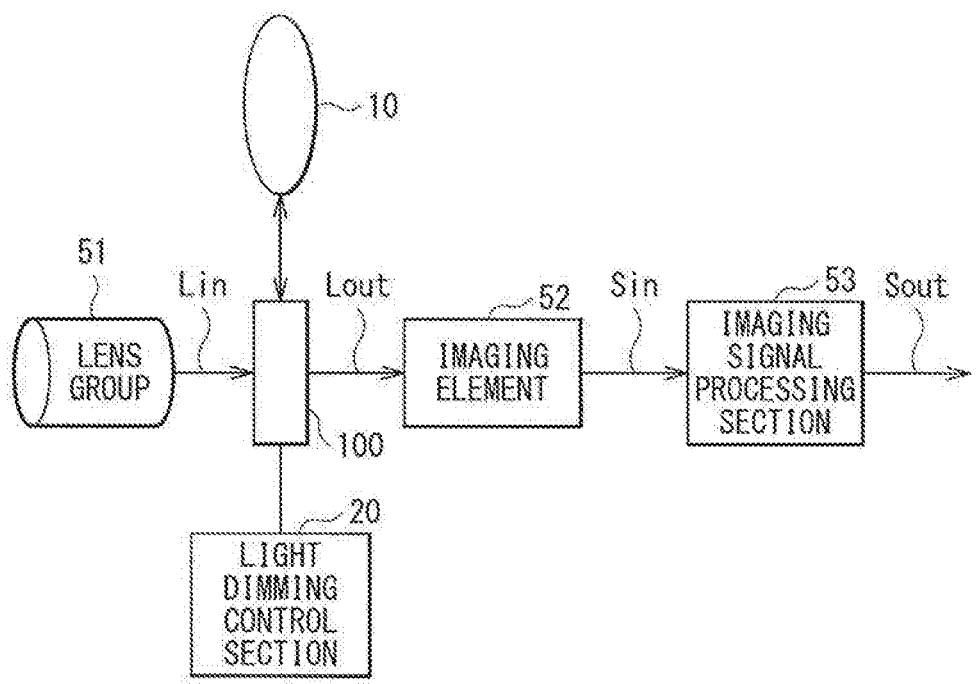

LIGHT DIMMER MODULE, LIGHT DIMMER SYSTEM, AND IMAGING DEVICE

CROSS REFERENCE TO RELATED APPLICATIONS

This application is a U.S. National Phase of International Patent Application No. PCT/JP2015/053350 filed on Feb. 6, 2015, which claims priority benefit of Japanese Patent Application No. JP 2014-077799 filed in the Japan Patent Office on Apr. 4, 2014. Each of the above-referenced applications is hereby incorporated herein by reference in its entirety.

TECHNICAL FIELD

The present technology relates to a light dimmer module that performs light dimming with use of a liquid crystal, and a light dimmer system and an imaging device that use the light dimmer module.

BACKGROUND ART

Imaging devices such as digital cameras and video cameras each include a lens and an imaging element disposed on an optical axis of the lens. A light dimmer element is disposed between the lens and the imaging element, and adjusts an amount of light traveling from the lens to the imaging element.

Attention has been given to a liquid crystal light dimmer element as such a light dimmer element (for example, refer to Patent Literature 1). It is possible to downsize the liquid crystal light dimmer element, which allows for space saving of the imaging device.

The liquid crystal light dimmer element adjusts magnitude of a drive voltage to vary light transmittance thereof. A relationship between the drive voltage and light transmittance is called VT characteristics, which is represented by an element-specific nonlinear curve. Accordingly, it is possible to specify, from the VT characteristics, the magnitude of the drive voltage that is necessary to obtain desired light transmittance.

CITATION LIST

Patent Literature

Patent Literature 1: Japanese Unexamined Patent Application Publication No. 2002-082358

SUMMARY

However, in actuality, it is difficult to obtain desired light transmittance even through application of a drive voltage having specified magnitude.

It is therefore desirable to provide a light dimmer module that makes it possible to control light transmittance at high accuracy, and a light dimmer system and an image device that use the light dimmer module.

A light dimmer module according to an embodiment of the present technology includes: a liquid crystal layer disposed between a pair of electrodes; and a transmittance sensor that detects light transmittance of the liquid crystal layer.

A light dimmer system according to an embodiment of the present technology includes the foregoing light dimmer module according to the embodiment of the present technology and a light dimming control section that controls the light dimmer module.

An imaging device according to an embodiment of the present technology includes the foregoing light dimmer module according to the embodiment of the present technology and an imaging element.

In the light dimmer module, the light dimmer system, or the imaging device according to the embodiment of the present technology, the transmittance sensor detects light transmittance of the liquid crystal layer.

According to the light dimmer module, the light dimmer system, and the imaging device of the embodiments of the present technology, the transmittance sensor detects the light transmittance of the liquid crystal layer, which makes it possible to adjust a drive voltage of the liquid crystal layer with use of a signal from the transmittance sensor. Accordingly, it is possible to adjust light transmittance at high accuracy. It is to be noted that effects described here are non-limiting, and effects achieved by the technology may be one or more of effects described in the present disclosure.

BRIEF DESCRIPTION OF DRAWINGS

FIG. 1 is a plan view of a configuration of a light dimmer module according to an embodiment of the present technology.

FIG. 2 is a diagram illustrating a cross-sectional configuration taken along a line II-II of FIG. 1.

FIG. 3 is a diagram illustrating a relationship between temperature and a current in a transmittance sensor illustrated in FIG. 1.

FIG. 4 is a block diagram for description of operation of the light dimmer module illustrated in FIG. 1.

FIG. 5 is a block diagram illustrating a configuration of a logarithmic conversion section illustrated in FIG. 4.

FIG. 6 is a circuit diagram illustrating an example of a configuration of an I-V conversion section illustrated in FIG. 5.

FIG. 7 is a diagram illustrating an example of a relationship between a collector-emitter voltage and a collector current of a phototransistor illustrated in FIG. 6.

FIG. 8 is a diagram illustrating VT characteristics of a liquid crystal layer.

FIG. 9 is another diagram illustrating the VT characteristics of the liquid crystal layer.

FIG. 10 is a diagram illustrating an imaging device according to an application example of the light dimmer module illustrated in FIG. 1.

FIG. 11 is a diagram for description of an element having known light transmittance.

FIG. 12 is another diagram for description of the element having the known light transmittance.

EMBODIMENTS

In the following, some embodiments of the present technology are described in detail with reference to the drawings. It is to be noted that description is given in the following order.

1. Embodiment (Light Dimmer Module)
2. Application Example (Imaging Device)

Embodiment

FIG. 1 illustrates a planar configuration of a liquid crystal light dimmer module (a light dimmer module 10) according to an embodiment of the present technology. The light dimmer module 10 is adapted to electrically adjust a light amount with use of a liquid crystal, and may be used, for example, as an ND filter of a digital camera (for example, an imaging device 5 in FIG. 10 to be described later). The light dimmer module 10 includes a light dimmer element 11, a wiring substrate 12, and a transmittance sensor 13. The wiring substrate 12 is coupled to the light dimmer element 11. The wiring substrate 12 may be a flexible wiring board (i.e., flexible printed circuits), for example. The wiring substrate 12 is provided with a plurality of wiring lines.

[Configuration of Light Dimmer Element 11]

FIG. 2 is a cross-sectional view of a configuration taken along a line II-II of FIG. 1. The light dimmer element 11 has a stacked configuration in which a transparent substrate 111a, a transparent electrode 112a, an alignment film 113a, a liquid crystal layer 110, an alignment film 113b, a transparent electrode 112b, and a transparent substrate 111b are stacked in this order along a traveling direction of light L. The light dimmer element 11 further includes a sealant 114, a spacer 115, and a sealing section 116. Note that FIG. 2 does not illustrate the wiring substrate 12.

The liquid crystal layer 110 is disposed between a pair of electrodes (transparent electrodes 112a and 112b), and contains liquid crystal molecules. At this occasion, the liquid crystal layer 110 contains predetermined dye molecules (dichroic dye molecules) in addition to the liquid crystal molecules (for simplified illustration, FIG. 2 illustrates the liquid crystal molecules and the dye molecules collectively as "molecules M"). In other words, the light dimmer element 11 is configured with use of a guest-host (GH) liquid crystal containing a dye (a dichroic dye). Absorption anisotropy of the dye molecules eliminates need for a polarizing plate; therefore, the guest-host (GH) liquid crystal makes it possible to improve light use efficiency.

Such a GH liquid crystal is broadly divided into a positive type and a negative type, based on difference in a long-axis direction of liquid crystal molecules under voltage application. In the positive type GH liquid crystal, long axes of liquid crystal molecules are aligned perpendicular to an optical axis under no voltage application (in an OFF state), and are aligned parallel to the optical axis under voltage application (in an ON state). In contrast, in the negative type GH liquid crystal, long axes of liquid crystal molecules are aligned parallel to the optical axis under no voltage application, and are aligned perpendicular to the optical axis under voltage application. At this occasion, the dye molecules are aligned in the same direction (orientation) as the liquid crystal molecules. Accordingly, in a case in which the positive type liquid crystal is used as a host, light transmittance becomes relatively low (a light exit side becomes relatively dark) under no voltage application, and becomes relatively high (the light exit side becomes relatively bright) under voltage application. In contrast, in a case in which the negative type liquid crystal is used as a host, light transmittance becomes relatively high (the light exit side becomes relatively bright) under no voltage application, and becomes relatively low (the light exit side becomes relatively dark) under voltage application. The liquid crystal layer 110 may be made of either the positive type or negative type liquid crystal. In the following, description is given of a case in which the liquid crystal layer 110 is made of the negative type liquid crystal as an example.

Each of the transparent electrodes 112a and 112b is an electrode adapted to apply a voltage (a drive voltage V) to the liquid crystal layer 110, and may be made of indium tin oxide (ITO), for example. The wiring substrate 12 is provided with wiring (first wiring) that is electrically coupled to the transparent electrodes 112a and 112B. A signal for driving of the liquid crystal layer 110 is transmitted to the transparent electrodes 112a and 112b through the wiring.

Each of the alignment films 113a and 113b is a film adapted to align respective liquid crystal molecules in the liquid crystal layer 110 to a desired direction (alignment direction). Each of the alignment films 113a and 113b may be made of, for example, a polymer material such as polyimide, and is subjected to rubbing treatment in a predetermined direction in advance to set the alignment direction of the liquid crystal molecules.

The transparent substrate 111a is a substrate on one side that is adapted to support the transparent electrode 112a and the alignment film 113a and seal the liquid crystal layer 110. The transparent substrate 111b is a substrate on the other side that is adapted to support the transparent electrode 112b and the alignment film 113b and seal the liquid crystal layer 110. Each of the transparent substrates 111a and 111b may be configured of a glass substrate, for example.

The sealant 114 is a member adapted to seal the molecules M (including the liquid crystal molecules and the dye molecules) in the liquid crystal layer 110 from side surface side, and may be made of, for example, an adhesive such as an epoxy adhesive and an acrylic adhesive. The spacer 115 is a member adapted to maintain a uniform cell gap (thickness) in the liquid crystal layer 110, and may be made of, for example, a predetermined resin material or a predetermined glass material. The sealing section 116 is a sealing inlet from which the molecules are put into the liquid crystal layer 110, and is thereafter a section that seals the molecules M in the liquid crystal layer 110 from outside.

Such a light dimmer element 11 has a light dimming region 11A and a detection target region 11B at positions adjacent to each other in plan view. The detection target region 11B and the light dimming region 11A are disposed in succession, and have a similar configuration. In the detection target region 11B and the light dimming region 11A that are connected to each other, the liquid crystal layer 110 operate identically when a voltage is applied to the transparent electrodes 112a and 112b. The light dimming region 11A is a main part of the light dimmer element 11, and occupies most of the light dimmer element 11. The light amount is adjusted by passing of the light L through the light dimming region 11A. The detection target region 11B may be disposed, for example, at an end of the light dimmer element 11.

In the present embodiment, the transmittance sensor 13 is disposed in the detection target region 11B of the light dimmer element 11. This makes it possible to adjust light transmittance of the light dimmer element 11 at high accuracy as described in detail later.

[Configuration of Transmittance Sensor 13]

The transmittance sensor 13 is adapted to detect light transmittance of light passing through the liquid crystal layer 110 of the detection target region 11, and outputs a signal (transmittance information I1 in FIG. 4 to be described later) corresponding to an amount of light having passed through the liquid crystal layer 110. The transmittance sensor 13 may have, for example, a transmissive photointerrupter configuration, and includes a light emitter 132 and a light receiver 133 in a support 131 of the transmittance sensor 13. The liquid crystal layer 110, the transparent substrate 111a and 111b, the transparent electrodes 112a and 112b, and light distribution films 113a and 113b are disposed between the light emitter 132 and the light receiver 133. The support 131 is adapted to support the light emitter 132 and the light receiver 133, and may be made of a resin material, for example. The support 131 extends so as to cover an end of a top surface (a surface opposite to a surface facing the liquid crystal layer 110) of the transparent substrate 111a and an end of a bottom surface (a surface opposite to a surface facing the liquid crystal layer 110) of the transparent substrate 111b with a side surface of the liquid crystal layer 110 in between. In other words, the support 131 is so disposed as to interpose the transparent substrates 111a and 111b from their ends, and the transmittance sensor 13 is fixed and integrated with the light dimmer element 11. For example, the light emitter 132 may be disposed apart from the bottom surface of the transparent substrate 111b at a position closer to the transparent substrate 111b than the transparent substrate 111a. For example, an LED (light emitting diode) may be used for the light emitter 132. It may be preferable that light emitted from the light emitter 132 not include an infrared component and ultraviolet component, and an emission range of the light emitter 132 be a visible region. The light receiver 133 is disposed at a position facing the light emitter 132 with the liquid crystal layer 110 in between. More specifically, the light receiver 133 may be disposed apart from the top surface of the transparent substrate 111a at a position closer to the transparent substrate 111a than the transparent substrate 111b. The light receiver 133 and the light emitter 132 may preferably face the liquid crystal layer 110 along a normal direction. For example, a phototransistor may be used for the light receiver 133. Light to be detected by the light receiver 133 is light in the visible region, and it may be preferable that the light receiver 133 not detect light in other regions. The light emitter 132 and the light receiver 133 may be reversed in position. For example, the transmittance sensor 13 may be electrically coupled to wiring (second wiring) provided in the wiring substrate 12.

A light-shielding film 14 may be preferably provided so as to allow light emitted from the light emitter 132 to enter the light receiver 133 in the normal direction. In other words, the light-shielding film 14 may preferably absorb light other than the light traveling from the light emitter 132 toward the normal direction to the light receiver 133. The light-shielding film 14 may be disposed, for example, on a surface facing the light receiver 133 of the transparent substrate 111a. The light-shielding film 14 has an aperture, and light from the light emitter 132 reaches the light receiver 133 through the aperture. Providing such a light-shielding film 14 makes it possible to prevent light of an unavailable component from being received by the light receiver 133. An example of the light of the unavailable component may be light that is to be reflected by end surfaces of the transparent substrates 111a and 111b and the sealant 144 and thereafter enter the light receiver 133 in light radially emitted from the light emitter 132.

A temperature sensor 15 (see FIG. 1) may be preferably disposed in proximity to the transmittance sensor 13. The temperature sensor 15 is adapted to detect a temperature in proximity to the transmittance sensor 13. For example, a thermistor may be used for the temperature sensor 15.

FIG. 3 illustrates temperature variation with respect to a current outputted from the transmittance sensor 13 at predetermined transmittance. For example, the transmittance sensor 13 may output a current I0 at a temperature T0, and may output a larger current I1 than the current I0 at a higher temperature T1 than the temperature T0. Even in a case in which equal light transmittance is detected, a signal of the transmittance sensor 13 varies with temperature. Providing the temperature sensor 15 makes it possible to correct variation in the signal caused by temperature variation in the transmittance sensor 13. The temperature sensor 15 may be preferably mounted in the wiring substrate 12.

[Operation of Light Dimmer Module 10]

Next, description is given of light dimming operation of the light dimmer module 10.

FIG. 4 illustrates a block configuration of a light dimming control section (a light dimming control section 20) together with the light dimmer module 10. The light diming control section 20 performs predetermined feedback control on the light dimmer module 10. The light dimmer module 10 and the light dimming control section 20 correspond to a specific example of a "light dimmer system" of an embodiment of the present technology. A current I (signal) from the transmittance sensor 23 is inputted to the light dimming control section 20, and the light dimming control section 20 supplies the light dimmer module 10 with a drive voltage Vout, based on the current I. The light dimming control section 20 may include, for example, a logarithmic conversion section 21, a temperature correction section 22, an absolute transmission amount corresponding section 23, a transmittance comparison section 24, a controller 25, and a drive section 26. The current I from the transmittance sensor 23 is subjected to logarithmic processing by the logarithmic conversion section 21 to be converted into transmittance information S1. Each of transmittance information S2 and S3, a setting value S4, differential information S5, and a drive signal S6 that are described later may be a signal of a logarithmic value.

FIG. 5 illustrates an example of a configuration of the logarithmic conversion section 21. The logarithmic conversion section 21 may include, for example, an I-V conversion section 211, an A/D conversion section 212, a log operation section 213, a range determination section 214, and an addition section 215.

FIG. 6 illustrates an example of a circuit configuration of the I-V conversion section 211. The I-V conversion section 211 is adapted to convert a current outputted from the transmittance sensor 13 into a voltage. The I-V conversion section 211 makes it possible to maintain high resolution even in a case in which a range of a current value outputted from the transmittance sensor 13 is wide.

The I-V conversion section 211 may include, for example, an operational amplifier 21A, a resistor element 21B, a resistor element 21C, a resistor element 21D, a resistor element 21E, an FET (Field effect transistor) 1, an FET 2, and an FET 3. Gates of the FET 1, the FET 2, and the FET 3 may be coupled to, for example, a GPIO (General purpose input/output) of a microcomputer, or a decoder. The FET 1, the FET 2, and the FET 3 are turned on or off by the range determination section 214 in accordance with magnitude of the current I outputted from the transmittance sensor 13 to allow for range switching. For example, the FET 1, the FET 2, and the FET 3 are turned on or off at every 3 EV. In other words, each of the FET 1, the FET 2, and the FET 3 is an FET for a switch for range switching. An analog switch may be used in place of each of the FET 1, the FET 2, and the FET 3. A bias voltage VB is applied to a positive input terminal of the operational amplifier 21A. A negative input terminal of the operational amplifier 21A is coupled to the transmittance sensor 13, and is coupled to an end of the transistor element 21B, a source of the FET 1, a source of the FET 2, and a source of the FET 3. A drain of the FET 1 is coupled to an end of the resistor element 21C. A drain of the FET 2 is coupled to an end of the resistor element 21D. A drain of the FET 3 is coupled to an end of the resistor element 21E. The other ends of the resistor elements 21B, 21C, 21D, and 21E are coupled to an output terminal of the operational amplifier 21A. The negative input terminal of the operational amplifier 21A is virtually short-circuited, thereby having the same potential (the voltage VB) as the positive input terminal. Accordingly, in a phototransistor (the light receiver 133) of the transmittance sensor 13, irrespective of a value of a collector current Ic, a collector-emitter voltage $V_{CE}$ is maintained at a fixed value irrespective of a current as illustrated in FIG. 7. This makes it possible to eliminate dependence of the collector-emitter voltage $V_{CE}$ in the light receiver 133 of the transmittance sensor 13 (see FIG. 2).

The output terminal of the operational amplifier 21A is coupled to the A/D conversion section 212. A voltage outputted from the I-V conversion section 211 is A/D converted by the A/D conversion section 212, and thereafter inputted to the log operation section 213. A signal from the log operation section 213 and information of a selected range from the range determination section 214 are inputted to the addition section 215, and thereafter, the transmittance information S1 is outputted from the addition section 215. In such a logarithmic conversion section 21, it is possible to keep an influence of a quantization error small even in a case in which a low-priced (for example, about 12-bit) A/D conversion section 212 is used.

The temperature correction section 22 is adapted to correct the transmittance information S1, based on the temperature information T supplied from the temperature sensor 15. The temperature correction section 22 may have, for example, temperature characteristics of the transmittance information S1 as a table. The transmittance information S1 is processed by the temperature correction section 22, and thereafter is inputted as the transmittance information S2 to the absolute transmission amount corresponding section 23. The transmittance information S2 has a value proportional to an amount of light received by the transmittance sensor 13.

The absolute transmission amount corresponding section 23 holds absolute transmittance TRX when the light dimmer element (the liquid crystal layer 110) has predetermined brightness, and the transmission information S2 is processed, based on the absolute transmittance TRX. In other words, the transmittance information S3 outputted from the absolute transmission amount corresponding section 23 is a logarithmic value of absolute transmittance. The absolute transmittance TRX may be determined as follows, for example. First, wave detection is performed on an element having known light transmittance TR0 (for example, an element 100 in FIGS. 11 and 12 to be described later). The wave detection is determined by detecting an amount of light entering from a light source to an imaging element (an imaging element 52 in FIG. 10 to be described later) such as a CCD (Charge-Coupled Device) and a CMOS (Complementary Metal-Oxide Semiconductor) through this element. A thus-detected value of the element having the known light transmittance TR0 in the imaging element is denoted as a detected value K0. For example, air, glass, or a film may be used as the element having the known light transmittance. Next, detection is performed on the light dimmer element 11 of which the brightness is adjusted to a predetermined value in a similar manner. A thus-detected value of the light dimmer element 11 in the imaging element is denoted as a detected value KX. Using the detected value K0, the detected value KX, and the light transmittance TR0 makes it possible to determine the absolute transmittance TRX as represented by a mathematical expression (1).

[Math. 1]

$$\log 2(TRX) = \log 2(KX/K0 \times TR0) \qquad (1)$$

In the absolute transmission amount corresponding section 23, the transmittance information S3 is calculated as represented by a mathematical expression (2) using the absolute transmittance TRX and the detected value KX.

[Math. 2]

$$S3 = S2 - \log 2(KX) + \log 2(TRX) \qquad (2)$$

The transmittance information S2 may be inputted to the transmittance comparison section 24 without providing the absolute transmission amount corresponding section 23.

The transmittance comparison section 24 calculates a difference between the setting value S4 and the transmittance information S3, and inputs differential information S5 to the controller 25. The controller 25 performs control operation so as to allow the differential information S5 to become zero, and an appropriate drive signal S6 is outputted to the drive section 26. The drive section 26 supplies the light dimmer module 10 with the drive voltage Vout, based on the drive signal S6, which causes the light dimmer module 10 to operate.

[Workings and Effects of Light Dimmer Module 10]

In the light dimmer module 10, light transmittance of the light dimmer element 11 (the liquid crystal layer 110) is detected by the transmittance sensor 13, which makes it possible to adjust the drive voltage Vout of the liquid crystal layer 110 with use of a signal (transmittance information I1) supplied from the transmittance sensor 13. Description about this is given below.

FIGS. 8 and 9 illustrate VT characteristics of the liquid crystal layer. The VT characteristics are physical properties specific to each liquid crystal layer, and it is possible to specify, from the VT characteristics, a drive voltage to obtain desired light transmittance.

However, for example, variations such as voltage variations, manufacturing variations of the liquid crystal layer, and temperature variations may occur to cause difficulty in actually obtaining desired light transmittance. For example, when the voltage V1 that is lower than the voltage V0 is applied actually in spite of trying to apply the voltage V0 in order to obtain transmittance T0, transmittance T1 that is higher than the transmittance T0 is obtained. Alternatively, when the voltage V1 that is higher than the voltage V0 is applied, transmittance T2 that is lower than the transmittance T0 is obtained (see FIG. 8). Moreover, in a case in which the VT characteristics of the liquid crystal layer are shifted from a curve VT0 estimated as the VT characteristics to a curve VT1 due to variations such as manufacturing variations and temperature variations, the transmittance T1 that is higher than the transmittance T0 is obtained. Alternatively, in a case in which the VT characteristics are shifted to a curve VT2, the transmittance T2 that is lower than the transmittance T0 is obtained (see FIG. 9). In the liquid crystal layer having steeply inclined VT characteristics, a difference between such a setting value (the transmittance T0) and actual light transmittance (the transmittance T1 or the transmittance T2) increases. Moreover, an influence of the difference between the setting value and the actual light transmittance increases with a decrease in light transmittance, which makes it difficult to use the liquid crystal layer at low transmittance.

In contrast, in the present embodiment, since the light dimmer module 10 includes the transmittance sensor 13, the light transmittance of the light dimmer element 11 is detected. The thus-detected light transmittance is supplied to the light dimming control section 20 as the light transmittance information I1, and the drive voltage Vout is supplied from the light dimming control section 20 to the light dimmer element 11, based on the light transmittance information I1. This makes it possible to eliminate the difference between the setting value and the actual light transmittance, thereby adjusting the light transmittance of the light dimmer element 11 at high accuracy. Moreover, it is possible to accurately adjust even the light transmittance of the liquid crystal layer 110 having steeply inclined VT characteristics. Further, it is possible to widely set the light transmittance of the light dimmer element 11. For example, it may be possible to achieve even absolute light transmittance that is as low as 1% or less.

As described above, in the light dimmer module 10 of the present embodiment, the transmittance sensor 13 detects the light transmittance of the liquid crystal layer 110. Accordingly, it is possible to adjust the drive voltage Vout of the liquid crystal layer 110 with use of the signal (the light transmittance information I1) outputted from the transmittance sensor. This makes it possible to adjust the light transmittance of the liquid crystal layer 110 at high accuracy.

Moreover, providing the temperature sensor 15 in proximity to the transmittance sensor 13 makes it possible to adjust the light transmittance at higher accuracy.

Further, using the transmittance sensor 13 having a transmissive photo-implanter configuration makes it possible to integrate the light dimmer element 11 with the transmittance sensor 13, thereby downsizing the light dimmer module 10. For example, the small-sized light dimmer module 10 may be suitably used for an imaging device such as a digital camera.

In a case in which the light dimmer module 10 is applied to the imaging device, it may be preferable that light emitted from the light emitter 132 of the transmittance sensor 13 not include the infrared component and the ultraviolet component, and the light receiver 133 detect light in the visible region. This makes it possible to reduce noise caused in an infrared region at low transmittance and to detect the light transmittance of the liquid crystal layer 110 throughout a wide region at high sensitivity.

One wiring substrate (the wiring substrate 12) may preferably include wiring that is electrically coupled to the transparent electrodes 112*a* and 112*b*, wiring that is electrically coupled to the transmittance sensor 13, and the temperature sensor 15. This makes it possible to downsize the light dimmer module 10.

In addition, in the transmittance comparison section 24, using transmittance information S0 of a known material makes it possible to calculate the absolute transmittance TRX in a case with transmittance information SX. Accordingly, storing the value of the one absolute transmittance TRX in the absolute transmission amount corresponding section 23 makes it possible to adjust the light dimmer element 11 to desired light transmittance, based on the absolute transmittance.

Application Examples

Next, description is given of application examples of the foregoing light dimmer module 10. The light dimmer module 10 may be applied to, for example, imaging devices such as a digital camera and a video camera.

FIG. 10 illustrates a block diagram of a schematic configuration of an imaging device (an imaging device 5). In the imaging device 5, an optical image of a subject is converted into an electrical signal by an imaging element (an imaging element 52 to be described later). It is possible to record a thus-obtained imaging signal (digital signal) in a semiconductor recording medium (not illustrated) or to display the imaging signal on a display unit (not illustrated) such as a liquid crystal display. The imaging device 5 includes a lens group 51, the light dimmer module 10, the imaging element 52, the temperature sensor 3, and an imaging signal processing section 53. The light dimming control section 20 is coupled to the light dimmer module 10, and performs the feedback control described in the foregoing embodiment.

The lens group 51 includes a plurality of lenses. One lens may be used.

The imaging element 52 is an element that detects imaging light (imaging light Lout) entering from the lens group 51 through the light dimmer module 10 to obtain an imaging signal. The imaging element 52 may be configured of, for example, an imaging sensor (a solid-state imaging device) such as a CCD and a CMOS.

The imaging signal processing section 53 performs predetermined signal processing on an imaging signal (an imaging signal Sin) obtained by the imaging element 52. The imaging signal processing section 53 may include, for example, an S/H-AGC circuit, an A/D conversion section, and other components.

The S/H-AGC circuit performs S/H (sample-hold) processing on the imaging signal outputted from the imaging element 52 and performs predetermined signal amplification using an AGC (Automatic Gain Control) function.

The A/D conversion section performs A/D conversion (analog-to-digital conversion) on the imaging signal outputted from the S/H-AGC circuit to generate an imaging signal that is a digital signal.

In the imaging device 5, imaging light Lin outputted from the lens group 51 enters the light dimmer module 10, and an amount of the light (an amount of the transmitted light) is adjusted, and the thus-adjusted light is outputted as the imaging light Lout. The imaging light Lout enters the imaging element 52, and is detected, thereby obtaining the imaging signal Sin. The imaging signal processing section 53 performs predetermined signal processing on the imaging signal Sin to generate the imaging signal Sout.

At this occasion, using the light dimmer module 10 that makes it possible to adjust light transmittance at high accuracy allows for an improvement in a function of the imaging device 5.

The imaging device 5 may include, for example, the element 100 having the known light transmittance TR0 as illustrated in FIG. 11, and the known element 100 may be preferably replaced by the light dimmer element 10 (see FIG. 12). This makes it possible to easily determine the transmittance information S0 of the element 100 and the transmittance information SX (or the absolute transmittance TRX).

Although the present technology is described referring to the embodiments, the present technology is not limited thereto, and may be variously modified. For example, in the foregoing embodiment, the light dimmer element using a guest-host liquid crystal is described as an example; however, the present technology is not limited thereto, and a liquid crystal other than the guest-host liquid crystal may be used.

Moreover, the feedback control performed by the light dimming control section described in the foregoing embodiment may be performed by hardware (a circuit) or software (a program).

Note that the effects described in the present specification are illustrative and non-limiting, and any other effects may be included.

It is to be noted that an embodiment of the present technology may have following configurations.

(1) A light dimmer module including:
a liquid crystal layer disposed between a pair of electrodes; and
a transmittance sensor that detects light transmittance of the liquid crystal layer.

(2) The light dimmer module according to (1), wherein
the liquid crystal layer has a light dimming region and a detection target region, and
the transmittance sensor detects light transmittance of the detection target region.

(3) The light dimmer module according to (2), wherein the light dimming region and the detection target region are disposed in succession.

(4) The light dimmer module according to any one of (1) to (3), wherein
the transmittance sensor includes a light emitter and a light receiver that faces the light emitter with the liquid crystal layer in between, and
the light receiver receives visible light.

(5) The light dimmer module according to (4), further including a light-shielding film that absorbs light other than light traveling from the light emitter toward a normal direction to the light receiver.

(6) The light dimmer module according to any one of (1) to (5), wherein the transmittance sensor has a transmissive photointerrupter configuration.

(7) The light dimmer module according to any one of (1) to (6), further including a wiring substrate including first wiring and second wiring, the first wiring being electrically coupled to the electrodes, and the second wiring being electrically coupled to the transmittance sensor.

(8) The light dimmer module according to (7), wherein a temperature sensor is mounted in the wiring substrate.

(9) A light dimmer system provided with a light dimmer module and a light dimming control section that controls the light dimmer module, the light dimmer module including:
a liquid crystal layer disposed between a pair of electrodes; and
a transmittance sensor that detects light transmittance of the liquid crystal layer.

(10) The light dimmer system according to (9), wherein the light dimming control section drives the liquid crystal layer, based on a signal outputted from the transmittance sensor.

(11) The light dimmer system according to (10), further including a temperature sensor that is disposed in proximity to the transmittance sensor and supplies the light dimming control section with temperature information,
wherein the light dimming control section corrects a signal from the transmittance sensor, based on the temperature information.

(12) The light dimmer system according to any one of (9) to (11), wherein the light diming control section holds absolute transmittance when the liquid crystal layer has predetermined brightness.

(13) The light dimmer system according to any one of (9) to (12), wherein
the light dimming control section has an I-V conversion section, and
the I-V conversion section performs range switching, based on magnitude of a signal outputted from the transmittance sensor.

(14) An imaging device provided with alight dimmer module and an imaging element, the light dimmer module including:
a liquid crystal layer disposed between a pair of electrodes; and
a transmittance sensor that detects light transmittance of the liquid crystal layer.

This application claims the benefit of Japanese Priority Patent Application No. JP 2014-077799 filed with the Japan patent office on Apr. 4, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A light dimmer module, comprising:
a liquid crystal layer between a pair of electrodes, wherein
the liquid crystal layer is configured to transmit light,
the liquid crystal layer comprises a light dimming region and a detection target region, and
the light dimming region is adjacent to the detection target region;
a transmittance sensor configured to:
detect light transmittance of the liquid crystal layer based on the transmitted light; and
output, based on the detected light transmittance, a signal to control a drive voltage of the light dimmer module; and
a wiring substrate that comprises a temperature sensor, wherein
the temperature sensor is configured to transmit temperature information associated with the transmittance sensor to a light dimming controller, and
the light dimming controller corrects a variation of the signal based on the temperature information.

2. The light dimmer module according to claim 1, wherein the transmittance sensor is further configured to detect light transmittance of the detection target region.

3. The light dimmer module according to claim 1, wherein
the transmittance sensor comprises a light emitter and a light receiver,
the liquid crystal layer is between the light emitter and the light receiver, and
the light receiver is configured to receive the transmitted light.

4. The light dimmer module according to claim 3, further comprising a light-shielding film configured to absorb a first portion of the transmitted light,
wherein the first portion of the transmitted light is different from a second portion of the transmitted light that travels from the light emitter in a normal direction towards the light receiver.

5. The light dimmer module according to claim 1, wherein the transmittance sensor has a transmissive photointerrupter configuration.

6. The light dimmer module according to claim 1, wherein
the wiring substrate further comprises a first wiring and a second wiring,
the first wiring is electrically coupled to the pair of electrodes, and
the second wiring is electrically coupled to the transmittance sensor.

7. A light dimmer system, comprising:
a light dimmer module comprising:
a liquid crystal layer between a pair of electrodes, wherein
the liquid crystal layer is configured to transmit light,
the liquid crystal layer comprises a light dimming region and a detection target region, and the light dimming region is adjacent to the detection target region;
a transmittance sensor configured to:
  detect light transmittance of the liquid crystal layer based on the transmitted light; and
  output, based on the detected light transmittance, a signal to control a drive voltage of the light dimmer module; and
a wiring substrate that comprises a temperature sensor, wherein the temperature sensor is configured to transmit temperature information associated with the transmittance sensor to a light dimming controller; and
the light dimming controller configured to:
  correct a variation of the signal based on the temperature information; and
  control, based on the signal, the drive voltage of the light dimmer module.

8. The light dimmer system according to claim 7, wherein the light dimming controller is further configured to drive the liquid crystal layer based on the signal.

9. The light dimmer system according to claim 7, wherein the light dimming controller is further configured to hold absolute transmittance based on the liquid crystal layer that has a threshold brightness.

10. The light dimmer system according to claim 7, wherein
the light dimming controller comprises an I-V converter, and
the I-V converter is configured to switch a range of the drive voltage based on a magnitude of the signal.

11. An imaging device, comprising:
a light dimmer module comprising:
  a liquid crystal layer between a pair of electrodes, wherein
    the liquid crystal layer is configured to transmit light,
    the liquid crystal layer comprises a light dimming region and a detection target region, and
    the light dimming region is adjacent to the detection target region;
a transmittance sensor configured to:
  detect light transmittance of the liquid crystal layer based on the transmitted light; and
  output, based on the detected light transmittance, a signal to control a drive voltage of the light dimmer module; and
a wiring substrate that comprises a temperature sensor, wherein
  the temperature sensor is configured to transmit temperature information associated with the transmittance sensor to a light dimming controller, and
  the light dimming controller corrects a variation of the signal based on the temperature information; and
an imaging element configured to generate an imaging signal based on the transmitted light.

12. A light dimmer module, comprising:
a liquid crystal layer between a pair of electrodes, wherein
  the liquid crystal layer is configured to transmit light,
  the liquid crystal layer comprises a light dimming region and a detection target region, and
  the light dimming region is adjacent to with the detection target region;
a transmittance sensor comprising a light emitter and a light receiver, wherein the transmittance sensor is configured to:
  detect light transmittance of the liquid crystal layer based on the transmitted light; and
  output, based on the detected light transmittance, a signal to control a drive voltage of the light dimmer module; and
a light-shielding film configured to absorb a first portion of the transmitted light, wherein
  the first portion of the transmitted light is different from a second portion of the transmitted light that travels from the light emitter in a normal direction towards the light receiver.

* * * * *